Nov. 22, 1966     A. M. RAWLES, SR     3,286,703
CARBURETOR FUEL HEATER FOR INTERNAL COMBUSTION ENGINES
Filed Nov. 13, 1964     2 Sheets-Sheet 2

INVENTOR.
AVERY M. RAWLES SR.
BY
Dean Laurence
ATTORNEY

United States Patent Office 3,286,703
Patented Nov. 22, 1966

3,286,703
CARBURETOR FUEL HEATER FOR INTERNAL COMBUSTION ENGINES
Avery M. Rawles, Sr., 135 Mount Carmel Drive, Natchez, Miss.
Filed Nov. 13, 1964, Ser. No. 410,961
1 Claim. (Cl. 123—122)

This invention relates to apparatus for heating the fuel used in internal combustion engines. More specifically, this invention relates to means for heating engine fuel in the carburetor float bowl whereby the fuel is vaporized before entry into the engine cylinders thereby significantly increasing the mileage of motor vehicles.

The prior art discloses diverse means to improve economy and efficiency of internal combustion engines, for example, by heating the fuel with energy from the exhaust gases or crankcase oil or by heating the intake manifold or heating the intake air. As far as it is known to me no one has used the engine coolant to vaporize the fuel in the carburetor float bowl which may be enlarged to accommodate the expanded fuel.

The principal object of this invention is to provide apparatus for heating the fuel utilized in an internal combustion engine.

A further object is to provide apparatus for heating engine fuel in a carburetor float bowl utilizing the engine coolant.

Yet another object is to provide an expanded carburetor float bowl to provide additional space to accommodate the expanded fuel after vaporization.

Still another object of this invention is to provide apparatus for vaporizing the fuel for an internal combustion engine in the carburetor float bowl whereby the mileage is significantly increased.

Other objects and advantages will clearly appear from a description of a preferred embodiment as shown in the accompanying drawings, in which.

Similar reference numerals are applied to similar elements throughout the drawings.

Figure 1:
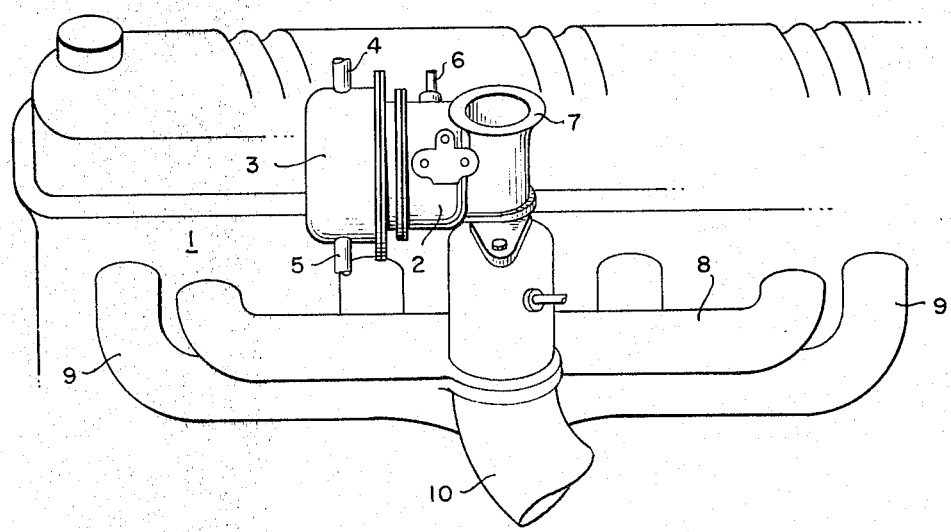
FIG. 1 shows the heater assembly as attached to a conventional carburetor on an internal combustion engine.

Turning now to FIG. 1, the conventional internal combustion engine 1, which may have any number of cylinders, comprises the usual carburetor 2 having a fuel line 6, an intake manifold 8, an exhaust manifold 9, and an exhaust pipe 10.

Figure 2:
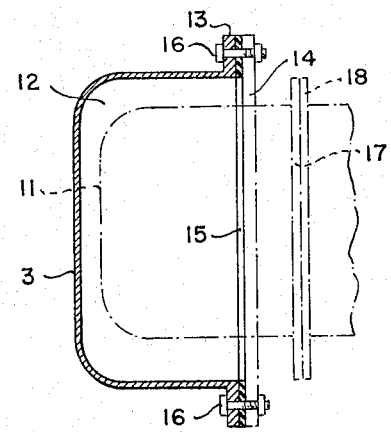
FIG. 2 shows the expanded float bowl with the surrounding heater jacket in section.
Figure 3:
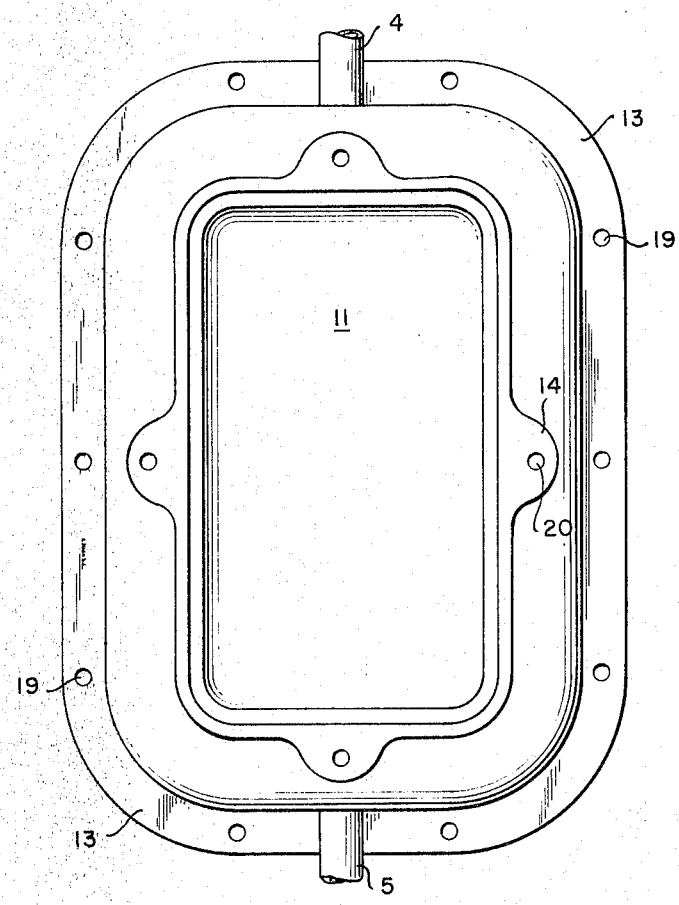
FIG. 3 shows the heater assembly detached from the carburetor.

As more clearly shown in FIGS. 2 and 3, the conventional carburetor float bowl is replaced with one having an expanded volume, for example, two or three times the normal volume, indicated by the numeral 11. However, the standard float bowl with normal dimensions will provide some increase in economy. The replacement float bowl 11 is provided with a flange 14 and with the usual flange 17 to mate with flange 18 on the carburetor. Surrounding the end of the float bowl 11 there is provided a heater jacket 3 which defines a space or cavity 12 between the heater jacket 3 ano the float bowl 11 having, for example, three-fourths of an inch clearance between members. The jacket and bowl may be fabricated of any desired material, for example, of 14-gauge steel. The jacket 3 is joined to the flange 14 on the float bowl by means of flange 13 on the jacket with fasteners such as bolts and nuts 16. A gasket 15 is placed between the flanges. The float bowl retains the diameter of the old float bowl and the expanded volume is obtained by extending the bowl 11 in the axial direction. FIG. 3 shows the jacket assembly looking from the carburetor toward the jacket assembly. Bolt holes 19 are provided in the jacket flange 13, and bolt holes 20 are provided in the float bowl flange 14. While bolts and nuts have been illustrated to fasten the flanges together, it will be obvious that machine screws and threaded holes could also be utilized.

On the heater jacket 3 there are provided, for example, ⅝-inch outside diameter 1½-inch long pipes 4 and 5 to receive a ⅝-inch hose from the water heater and from the water pump, respectively. After a warm-up period the hot water passing through the heater jacket through these connections vaporizes the gasoline in the float bowl 11.

Using a Holley carburetor modified in accordance with this invention tests have shown that at speeds of 55 to 65 miles per hour a pasenger car obtains a 20% increase in mileage with low octane gasoline. At slower speeds of 45 to 50 miles per hour an even greater economy was realized, e.g., in the neighborhood of a 30% increase. Repeated tests provided the same results. Application of heat directly to the modified float bowl of this invention allows the gasoline to vaporize which permits the fuel to burn cleaner and thereby obtain the full amount of power. Apparently, the gasoline formerly lost through the exhaust is now more completely burned. While the tests mentioned were conducted on the highway, similar economy may be expected in city driving.

There has been illustrated and described a preferred embodiment of apparatus to vaporize the fuel in the float bowl of an internal combustion engine carburetor whereby a significant increase in economy of fuel is obtained.

While for purposes of description I have shown and described a specific embodiment of my invention, it will be apparent that changes and modifications can be made therein without departing from the spirit of my invention or the scope of the appended claim.

I claim:
A fuel vaporizer for a liquid cooled internal combustion engine comprising:
 a carburetor having a flanged housing;
 a float bowl having a first flange corresponding with and attached to said flange on said carburetor housing;
 a fuel inlet in said float bowl;
 a second flange extending externally from said float bowl and spaced from said first flange;
 a flanged jacket surrounding said float bowl and sealingly attached to said second flange thereon forming a closed chamber of uniform dimension around said float bowl;
 a liquid inlet in said chamber;
 and a liquid outlet in said chamber disposed oppositely of said liquid inlet in said chamber whereby said liquid is passed through said chamber in a heat exchange relationship with said float bowl to vaporize fuel in said float bowl.

References Cited by the Examiner
UNITED STATES PATENTS

| | | | |
|---|---|---|---|
| 719,326 | 1/1903 | Gross | 165—51 X |
| 1,281,778 | 10/1918 | Hifner. | |
| 1,318,068 | 10/1919 | Giesler | 123—122 |
| 1,760,005 | 5/1930 | Ryder | 165—51 |
| 1,974,586 | 9/1934 | Prentiss | 123—122 |

CARLTON R. CROYLE, Primary Examiner.
KARL J. ALBRECHT, Examiner.